(12) United States Patent
Muguruma

(10) Patent No.: US 9,929,807 B2
(45) Date of Patent: Mar. 27, 2018

(54) VISIBLE LIGHT RECEIVING METHOD

(71) Applicant: UNIVERLINK INC., Nagoya-shi, Aichi (JP)

(72) Inventor: Hiroshi Muguruma, Nisshin (JP)

(73) Assignee: UNIVERLINK INC., Nagoya-shi (JP)

(*) Notice: Subject to any disclaimer, the term of this patent is extended or adjusted under 35 U.S.C. 154(b) by 59 days.

(21) Appl. No.: 15/119,573

(22) PCT Filed: Mar. 10, 2015

(86) PCT No.: PCT/JP2015/056946
§ 371 (c)(1),
(2) Date: Aug. 17, 2016

(87) PCT Pub. No.: WO2015/137313
PCT Pub. Date: Sep. 17, 2015

(65) Prior Publication Data
US 2017/0063455 A1    Mar. 2, 2017

(30) Foreign Application Priority Data

Mar. 14, 2014    (JP) .................................. 2014-52562

(51) Int. Cl.
*H04B 10/116*    (2013.01)
*H04N 5/235*    (2006.01)

(52) U.S. Cl.
CPC ......... *H04B 10/116* (2013.01); *H04N 5/2351* (2013.01); *H04N 5/2357* (2013.01)

(58) Field of Classification Search
CPC ... H04B 10/116; H04N 5/2351; H04N 5/2357
See application file for complete search history.

(56) References Cited

U.S. PATENT DOCUMENTS 8,520,065 B2    8/2013   Staats et al.
2002/0175269 A1   11/2002   Krymski
(Continued)

FOREIGN PATENT DOCUMENTS

JP    2008-283446 A    11/2008
JP    2010-213220 A     9/2010
(Continued)

OTHER PUBLICATIONS

Extended (supplementary) European Search Report dated Jul. 3, 2017, issued in counterpart European Application No. 15761847.1. (8 pages).
(Continued)

*Primary Examiner* — Leslie Pascal
(74) *Attorney, Agent, or Firm* — Westerman, Hattori, Daniels & Adrian, LLP

(57) ABSTRACT

A visible light transmitting signal is modulated on the basis of an information signal to be transmitted, and is superimposed on a visible light to be transmitted. A camera (10) photographs the transmitted visible light by use of a pixel amplifier sequential output type imaging element (11), and the pixel amplifier sequential output type imaging element (11) amplifies electric charges generated in respective pixels by respective pixel amplifiers (22), to output imaging signals in sequence from the respective pixel amplifiers (22). Image data of light and dark bands acquired from the imaging signals are taken in by frame, and a differential value is calculated for displacement of exposure amounts of the respective pixels output in sequence or the respective rows. The transmitted information signal is demodulated on the basis of the differential value of the imaging signals of a plurality of samples serving respective pixels or respective rows as one sample in one frame.

4 Claims, 11 Drawing Sheets

(56) References Cited

U.S. PATENT DOCUMENTS

2013/0027528 A1* 1/2013 Staats ................. G01S 5/0009
                                                    348/61
2013/0272717 A1  10/2013 Deguchi et al.
2014/0037296 A1   2/2014 Yamada et al.

FOREIGN PATENT DOCUMENTS

| JP | 2011-14957 A | 1/2011 |
| JP | 2011-55288 A | 3/2011 |
| JP | 2013-223047 A | 10/2013 |
| JP | 5393917 B1 | 1/2014 |
| WO | 2013/064835 A2 | 5/2013 |

OTHER PUBLICATIONS

Danakis et al., "Using a CMOS Camera Sensor for Visible Light Communication", 2012 IEEE Globecom Workshops, Dec. 2012, pp. 1244-1248.
International Search Report dated Apr. 14, 2015, issued in counterpart application No. PCT/JP2015/056946 (2 pages).

* cited by examiner

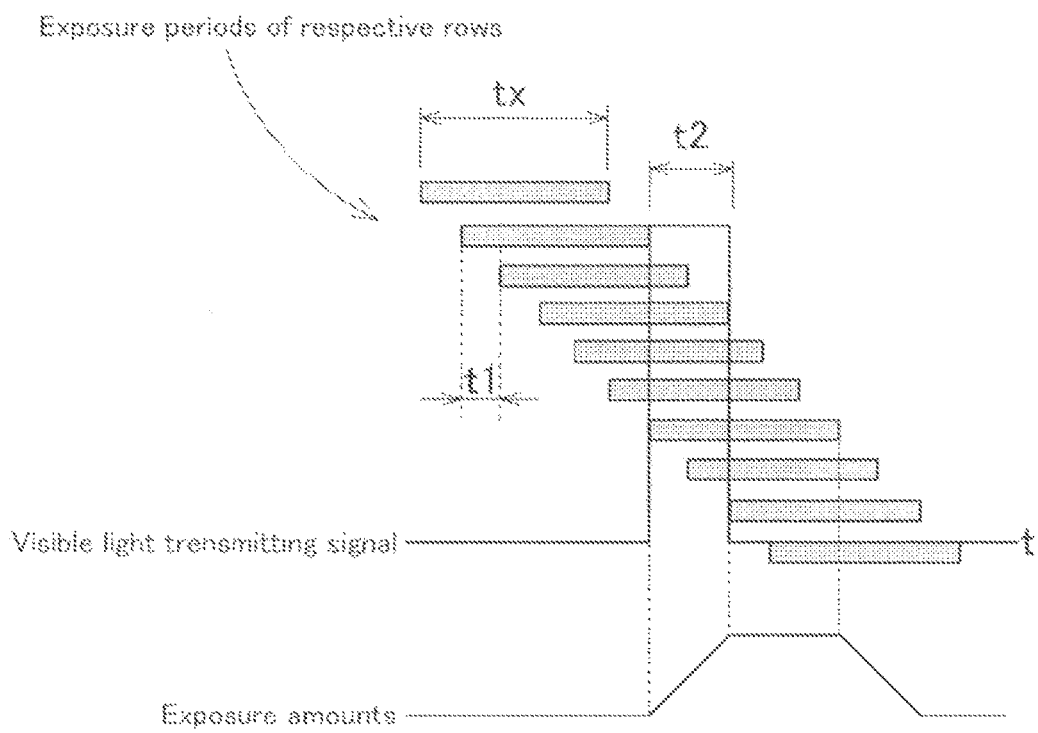

VISIBLE LIGHT RECEIVING METHOD

TECHNICAL FIELD

The present invention relates to a visible light receiving method and an apparatus of the method which are used for visible light communication. In particular, the present invention relates to a visible light receiving method which is suitably usable in a portable terminal or the like such as a personal digital assistant, a mobile telephone, which is equipped with a camera (a digital camera or a digital video camera).

BACKGROUND ART

In recent years, visible light communication using a visible light as a communication medium has been developed, and a visible light communication apparatus that performs visible light communication by use of a visible light such as an illuminating ray has been proposed in Patent Literature 1 below and the like.

With respect to this conventional visible light communication apparatus, a visible light communication apparatus which superimposes a transmitting signal on a visible light to transmit it operates so as to generate a transmitting signal by performing modulation by the 4-level PPM method (pulse-position modulation) onto an information signal (pulse signal) to be transmitted, to apply the transmitting signal to a light source using an LED to drive the LED, and superimpose the transmitting signal on a visible light irradiated from the LED, to transmit it.

Further, in this visible light communication apparatus, in order to effectively use an ordinary use light source for illumination as a light source of the visible light communication apparatus, at the time of applying a PPM signal to the LED light source for illumination, the LED is continuously lit during a period of a digital value of "0" which is relatively long, and the LED is operated to blink on and off at a shorter frequency by a sub-carrier carrier signal during a period of a digital value of "1" which is short in time, thereby securing necessary illuminance for illumination at the time of transmission in visible light communication.

On the other hand, in recent years, portable terminals such as mobile telephones have become remarkably popular, and most people carry portable terminals with them on a daily basis. Further, because a digital camera available for video recording is normally mounted in this type of portable terminal, users live in an environment where they can routinely photograph with a camera.

Therefore, conventionally, in Patent Literature 2 below, there has been proposed a visible light communication apparatus which photographs a visible light irradiated from a light source for illumination serving as a light source of the visible light communication apparatus that performs visible light communication, that is, an illuminating ray for visible light communication on which an information signal to be transmitted is superimposed with a camera of a portable terminal or the like, and analyzes the photographed image data to extract a data bit string contained in the image data, and demodulates information signal data transmitted from the data bit string.

CITATION LIST

Patent Literatures

Patent Literature 1: JP No. 2008-283446 A
Patent Literature 2: JP No. 2011-55288 A
Patent Literature 3: U.S. Pat. No. 8,520,065

SUMMARY OF INVENTION

Technical Problem

However, because the above-described visible light communication apparatus photographs the light source of the visible light communication apparatus with, for example, a light source for illumination serving as a visible light source with a digital camera or a video camera, that is, directly photographs a luminous visible light irradiated from the light source for illumination (light from the light source) with the camera, the exposure of the camera is logically automatically adjusted for the entire viewing surface. Therefore, an image of the light source on the photographed image goes blank so as to be photographed in an overexposed state.

Therefore, even if the image data photographed by the camera is subjected to image processing, it is extremely difficult to precisely extract visible light transmission data contained in the image data in an overexposed state even for an image processing technology of a microcomputer operating at high speed.

Further, when photographing a visible light, even in the case where a photographed image is not brought into an overexposed state, because a contour and the like of the image are contained as noise in visible light transmission data, it is difficult to precisely extract the visible light transmission data from the image data.

On the other hand, in the following Patent Literature 3, there has been proposed a visible light communication apparatus which, by use of a digital camera equipped with a pixel amplifier sequential output type imaging element such as a CMOS image sensor, as an imaging element for the digital camera, accumulates electric charges in the pixels in the row at a timing for each row of pixels, to output signals based on the electric charges accumulated in the respective pixels in sequence at timings for respective pixels from the pixel amplifiers of the respective pixels, and generates light and dark bands based on the transmitted signals in the row direction of the pixels in a photographed image, thereby extracting and demodulating the transmitting signal on the basis of a state of generation of the light and dark bands.

The digital modulation/demodulation method of this conventional visible light communication apparatus is roughly one of pulse-width modulation/demodulation methods, a visible light transmitting signal which is irradiated as a visible light to be transmitted is superimposed to be transmitted on a visible light with an irradiated pulse width of an Irradiated-pulsed visible light signal, and the irradiated visible light is photographed by the digital camera.

At this time, light and dark bands are generated in the image signals output from the respective pixels of the imaging element of the digital camera, and the output signals from the respective pixels corresponding to the light and dark bands of the imaging element are output so as to be shifted a predetermined time t1 by t1 as shown in FIG. 11.

Then, in this conventional digital modulation/demodulation method, a PWM-modulated transmitting signal is superimposed on a visible light to be transmitted, and the digital camera serving as a receiving apparatus measures a width (length, time) of light and dark bands generated in an imaged photographed image, and demodulates the transmitted visible light transmitting signal on the basis of the width of the light and dark bands. This width of the light and dark bands generated in the photographed image is a value which is substantially proportional to an exposure period tx of the digital camera, and proportional to a pulse width of the visible light transmitting signal.

However, as shown in FIG. 11, normally, the exposure time tx is longer than a signal width t2 of a visible light transmitting signal, and a received signal acquired as an exposure amount is integrated as a summation of brightness in an exposure time. Therefore, an exposure amount of a received signal inclines in the period of the signal width t2 in which a pulse of a transmitting signal is generated, precise pulse signal information with the signal width t2 which the visible light transmitting signal has disappears, thereby it is impossible to precisely demodulate the received signal.

Moreover, in the digital modulation/demodulation method for visible light communication in the above-described Patent Literature 3, for example, in the case where a frequency of a transmitted pulse signal which Is superimposed on a visible light to be transmitted is 2 KHz, and a cycle of the signal is 5 milliseconds, a width of the light and dark bands in the imaged image is 5 milliseconds. Therefore, provided that a shutter speed of the digital camera is set to, for example, 1/5000seconds which is an extremely high speed as a shutter speed of a camera, the exposure time tx is set to 5 milliseconds, and the pulse width t2 of a visible light transmitting signal is set to, for example, 0.5 milliseconds (a time of 1 symbol of a 4-level PPM modulated transmitting signal), only one visible light transmitted pulse signal is taken into one light and dark band as shown in FIG. 11, a length of an image signal showing the light and dark band corresponds to a length of the transmitted pulse signal, thereby there is a possibility to demodulate the transmitted pulse signal which is subjected to visible light transmission on the basis of the width (the exposure time tx) of the light and dark band.

However, as in the case of a normal digital camera for example, in the case where the digital camera receives a visible light transmitting signal under the conditions that a shutter speed is set to 1/500seconds, the exposure time tx is set to 50 milliseconds, and the pulse width t2 of the visible light transmitting signal is set to 0.5 milliseconds, two or more transmitted pulse signals enter into the exposure time tx based on the shutter speed, which results in disappearance of the information on the transmitted pulse signal by demodulation based on a width of light and dark bands, and it is impossible to demodulate the transmitting signal. Therefore, there has been a problem that a frequency of a visible light transmitting signal, that is, a transmission speed of the visible light transmission data is limited by a shutter speed (an exposure time) of the digital camera, thereby inhibiting speed-up of a transmission speed in visible light communication.

An object of the present invention is to solve the above-described problem, and to provide a visible light receiving method for photographing a visible light for visible light communication, and receiving a transmitting signal for visible light communication by use of a portable terminal or the like equipped with a general-purpose camera, the method in which, it is possible to stably and reliably receive a transmitting signal, and intend to speed up a visible light communication speed.

Solution to Problem

A visible light receiving method of the present invention which is for solving the above-described problem includes photographing a visible light irradiated for visible light communication by a camera having an imaging element, and receiving a visible light transmitting signal which is superimposed on the visible light to be transmitted, on the basis of image data from the imaging element photographed by the camera, characterized in that the visible light transmitting signal is modulated on the basis of an information signal to be transmitted, to be superimposed on the visible light, the camera performs photographing by use of a pixel amplifier sequential output type imaging element, and the pixel amplifier sequential output type imaging element amplifies electric charges generated in respective pixels by respective pixel amplifiers, to output imaging signals in sequence from the respective pixel amplifiers, takes in image data of light and dark bands acquired from the imaging signals by frame, and calculates a differential value on the basis of a difference in exposure amounts of the respective rows of the pixels output in sequence or the respective pixels, to demodulate the signal on the basis of the differential value of the imaging signals of a plurality of samples serving respective rows or respective pixels as one sample in one frame.

In accordance with this invention, a plurality of samples of information signals are taken-in in one processing by serving respective rows of image data in one frame as one sample, and further, a differential value is calculated from displacement of exposure amounts of the respective rows of pixels corresponding to light and dark bands in image data of the respective samples. This differential value shows a transmitted pulse signal of a visible light.

Therefore, it is possible to precisely demodulate pulse information on the transmitted pulse signal which is transmitted by visible light transmission on the basis of the differential value of the exposure amounts generated for the respective rows of the pixels corresponding to the light and dark bands. Moreover, because a differential value of the exposure amounts of the pixels of the respective rows is calculated, and a transmitted pulse signal is extracted from a waveform of the differential value, a transmission speed (a width of light and dark bands) of a transmitting signal is not, as in the conventional method, limited by an upper limit of a shutter speed in any case, and it is possible to receive a visible light transmitting signal transmitted at a speed much higher than that in the conventional method by merely performing photographing by a general-purpose camera, to demodulate the transmitting signal at high speed.

Here, in the above-described visible light receiving method, the above-described visible light transmitting signal is subjected to on/off modulation on the basis of an information signal to be transmitted, to be superimposed on the visible light, the differential value is calculated by differentiating exposure amounts denoting the light and dark bands, a predetermined threshold value is set with respect to the differential value, and the differential value data is digitalized on the basis of the threshold value, thereby it is possible to demodulate the visible light transmitting signal.

Further, here, it is preferable that a pulse width of the above-described visible light transmitting signal is shorter than an exposure period of the respective rows of the pixels during imaging by the above-described camera, and a pulse interval of the visible light transmitting signal is set to be different from the exposure period. In addition, an exposure period means a period to accumulate electric charges on the basis of light received by the respective pixels of the above-described imaging element, and a length (width) of the light and dark bands appearing in an photographed image is a time which is substantially proportional to a time of this exposure period, and proportional to the transmitted visible light transmitting signal.

Thereby, in the case where the image data of the light and dark bands (luminance component of pixels), that is, the exposure amounts denoting the light and dark bands, are differentiated to calculate a differential value, and a negative differential value is generated in a waveform of the differential value, a phenomenon that the negative differential value is generated at the same timing of a positive differential value in the pulse of the following transmitting signal does not occur, therefore, it is possible to stably and reliably receive a transmitting signal, and demodulate the received data.

Further, here, it is preferable that the above-described exposure period is set to be longer than a pulse interval of the above-described visible light transmitting signal. In accordance with this, even in the case where the exposure period is determined by the performance of the camera, it is possible to speed up a transmission speed of a transmitted pulse signal by shortening a pulse interval of a visible light transmitting signal, and it is possible to precisely demodulate the visible light transmitted pulse signal on the basis of a calculated differential value.

Advantageous Effects of Invention

In accordance with the visible light receiving method of the present invention, it is possible to photograph a visible light for visible light communication by use of a general-purpose camera, and receive a visible light transmitting signal transmitted for visible light communication, to demodulate the transmitted visible light transmitting signal at high speed.

BRIEF DESCRIPTION OF DRAWINGS

FIG. 11 is a timing chart of exposure periods of pixels of respective rows, a transmitting signal, and respective graphs of exposure amounts, which shows the conventional visible light receiving demodulation method.

DESCRIPTION OF EMBODIMENTS

Figure 1:
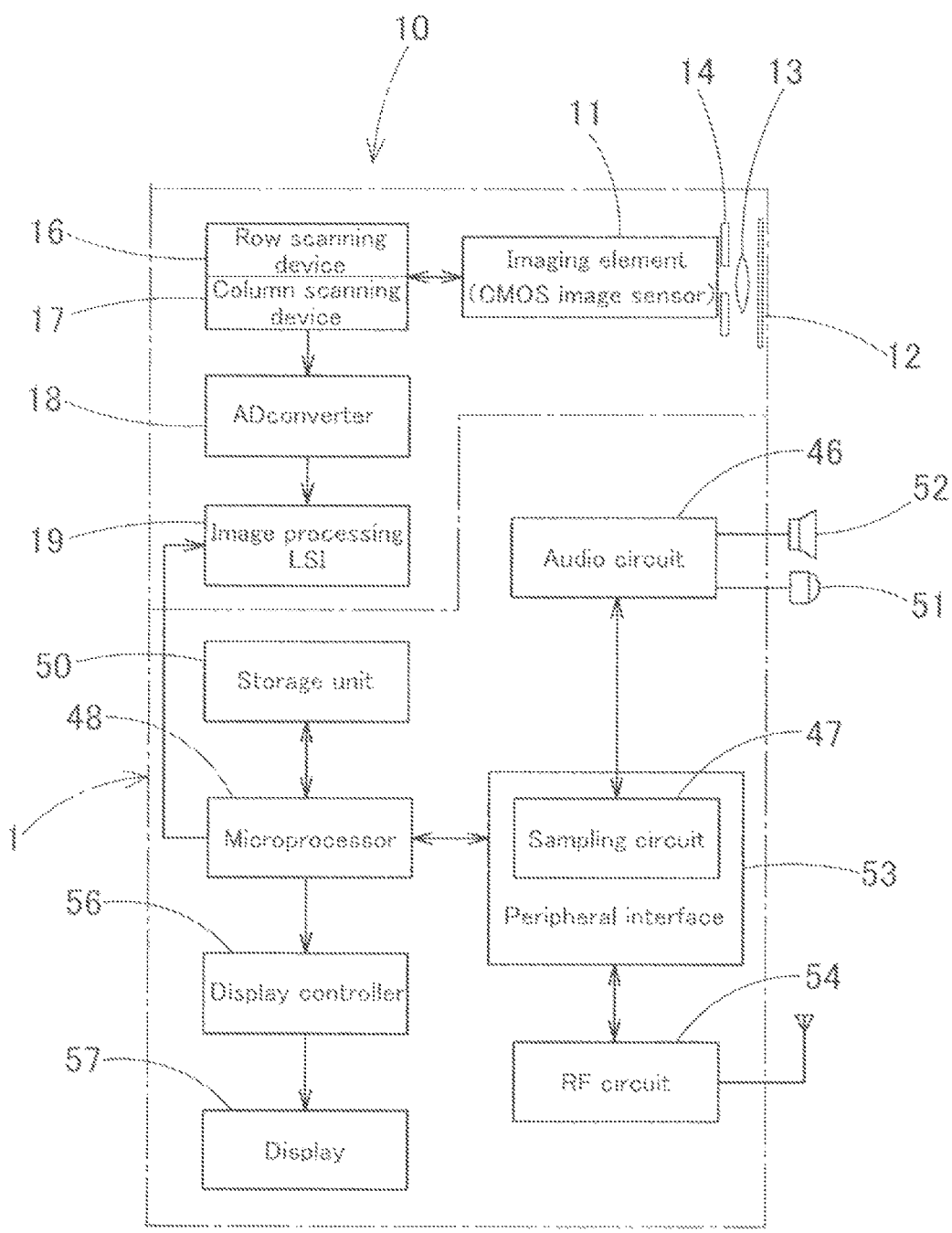
FIG. 1 is a configuration block diagram of a visible light receiving apparatus as an embodiment which implements a visible light receiving method of the present invention.

Hereinafter, an embodiment of the present invention will be described on the basis of the drawings. FIG. 1 shows a schematic configuration block diagram of a portable terminal 1. This portable terminal 1 is equipped with a visible light receiving apparatus which implements a visible light receiving method, and photographs a visible light irradiated for visible light communication, and receives a visible light transmitting signal.

The portable terminal 1 is a terminal device in which a camera (digital camera) 10 such as a mobile telephone is mounted, that photographs a still image or a moving image by operating a function switch and the like in a camera mode of the portable terminal 1. When photographing a still image or a moving image, the portable terminal 1 receives an information signal of a visible light transmitted for visible light communication.

As shown in FIG. 1, in an optical incident part of the camera 10, an imaging lens 13 is installed, an iris 14 having a diaphragm function is disposed on the inner side of the lens 13, and an imaging element 11 is disposed on the inner side of the iris (iris diaphragm mechanism) 14, which allows a visible light of a photographed image to be incident thereto through the lens 13 and the iris 14. The iris 14 may be a diaphragm mechanism in place of an ND filter (neutral density filter).

In addition, an optical diffusion filter 12 is disposed in front of the lens 13 in order to receive a visible light signal transmitted for visible light communication. Meanwhile, without providing the optical diffusion filter 12, and a normal image may be photographed by a normal digital camera, so as to generate light and dark bands in the image, then a visible light signal may be received.

In the case where the optical diffusion filter 12 is disposed in front of the lens 13, a diffusion light of an object is incident to the camera 10, and even if a projector of a visible light transmitter that projects a visible light for visible light communication is an illumination fixture such as a spotlight, the image of the light source from the projector is not overexposed in any case. Moreover, by the optical diffusion filter 12, it is possible to diffuse and cause a light from an object to be incident to the camera 10, and photograph the visible light as a diffusion light in a blurring state. Thereby, without contrast or a contour of the object having a harmful effect (noise) on extraction of light and dark bands, it is possible to easily capture light and dark bands in the image when photographing a visible light for visible light communication.

The optical diffusion filter 12 is composed of a sheet glass or a film sheet such as a ground-glass or an optical diffusion film which has an optical diffusion layer, and at the time of receiving a visible light, the optical diffusion filter 12 may be pasted on the outer surface of the lens 13 exposed to the outside of the portable terminal 1, to be used. Further, the apparatus may have a structure in which the optical diffusion filter 12 is installed so as to be movable inside the portable terminal 1, and at the time of receiving a visible light, the optical diffusion filter 12 is moved so as to enter in the incident optical path by a switch operation or the like, and at the time of using the camera for normal photography, the optical diffusion filter 12 is moved so as to get out of the optical path.

Further, the optical diffusion filter 12 may be composed of a film liquid crystal that switches between optical diffusion and optical transmission according to an applied voltage. The film liquid crystal is a thin and lightweight liquid crystal filter with the inside filled with superimposed films, for example, TN liquid crystal, and for a normal time, the liquid crystal is switched to an optical transmitting state, to be available for use as a normal camera, and at the time of receiving a visible light, the liquid crystal is brought into an optical diffusion state such as being milky white according to an applied voltage. Such a film liquid crystal may be conveniently used as an optical diffusion filter 12 which is capable of switching between optical diffusion and optical transmission.

As the imaging element 11 of the camera 10, the pixel amplifier sequential output type imaging element 11 in which electric charges generated in respective pixels 21 are amplified by respective pixel amplifiers 22, and imaging signals are output in sequence from the respective pixel amplifiers 22, is built into the portable terminal 1. As a pixel amplifier sequential output type imaging element, a CMOS image sensor is an imaging element in which electric charges generated in pixels are amplified by respective pixel amplifiers, and imaging signals are output in sequence from the respective pixel amplifiers, and therefore may be suitably used. The pixel amplifier sequential output type imaging element 11 is configured as shown in FIG. 2, and its scanning device is composed of a row scanning device 16 that performs scanning along the row direction, and a column scanning device 17 that performs scanning along the column direction.

Figure 2:
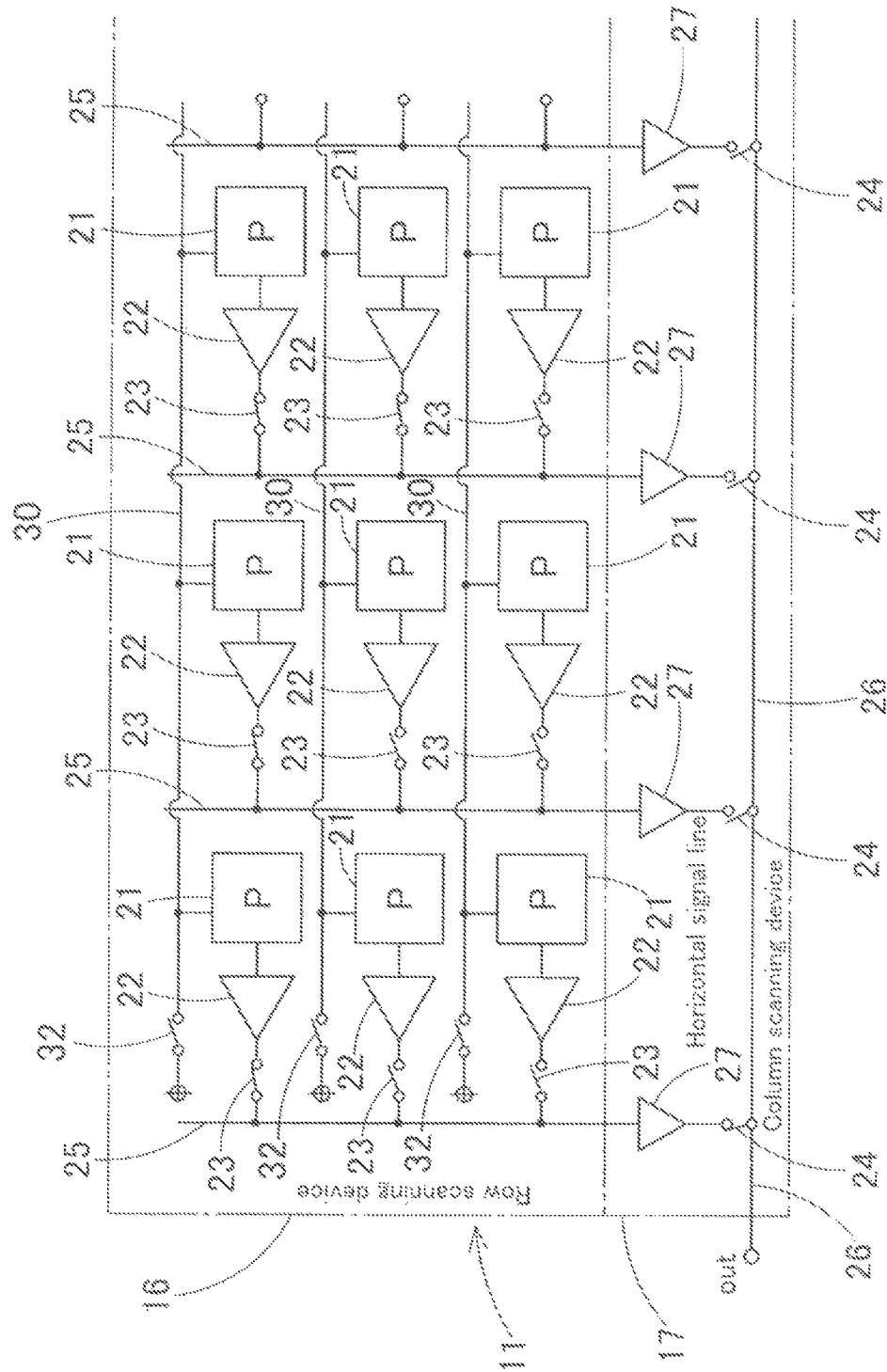
FIG. 2 is a schematic configuration block diagram of a pixel amplifier sequential output type imaging element.
Figure 3:
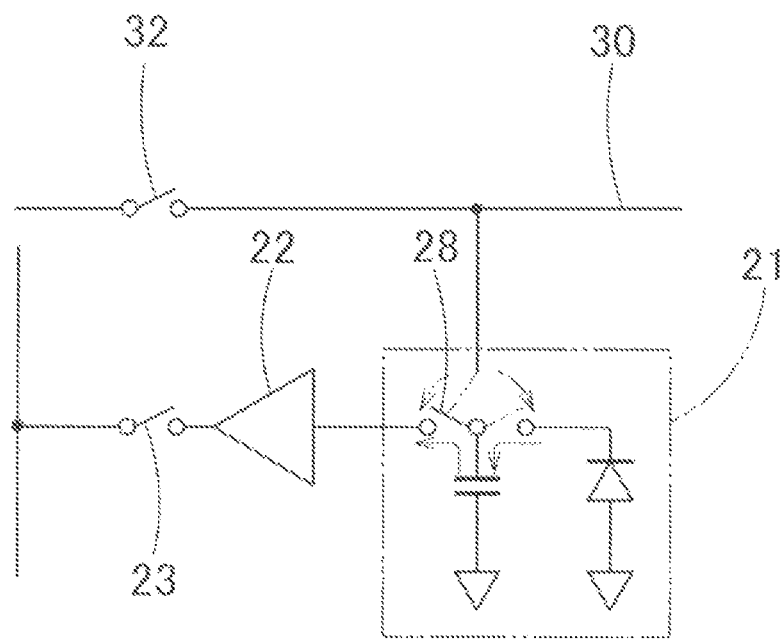
FIG. 3 is a circuit configuration explanatory diagram of a pixel.

In the pixel amplifier sequential output type imaging element 11 formed of a CMOS image sensor, as shown in FIG. 2, many pixels 21 are arrayed in a matrix state of rows and columns. As shown in FIG. 3, the respective pixels 21 are each configured to have a light receiving element and a capacitor unit for accumulating electric charges generated in the light receiving element, and to switch between electric charge accumulation generated at the time of exposure and pixel signal output on the basis of the accumulated electric charges according to a switching operation of the changing-over switch 28.

Figure 5:
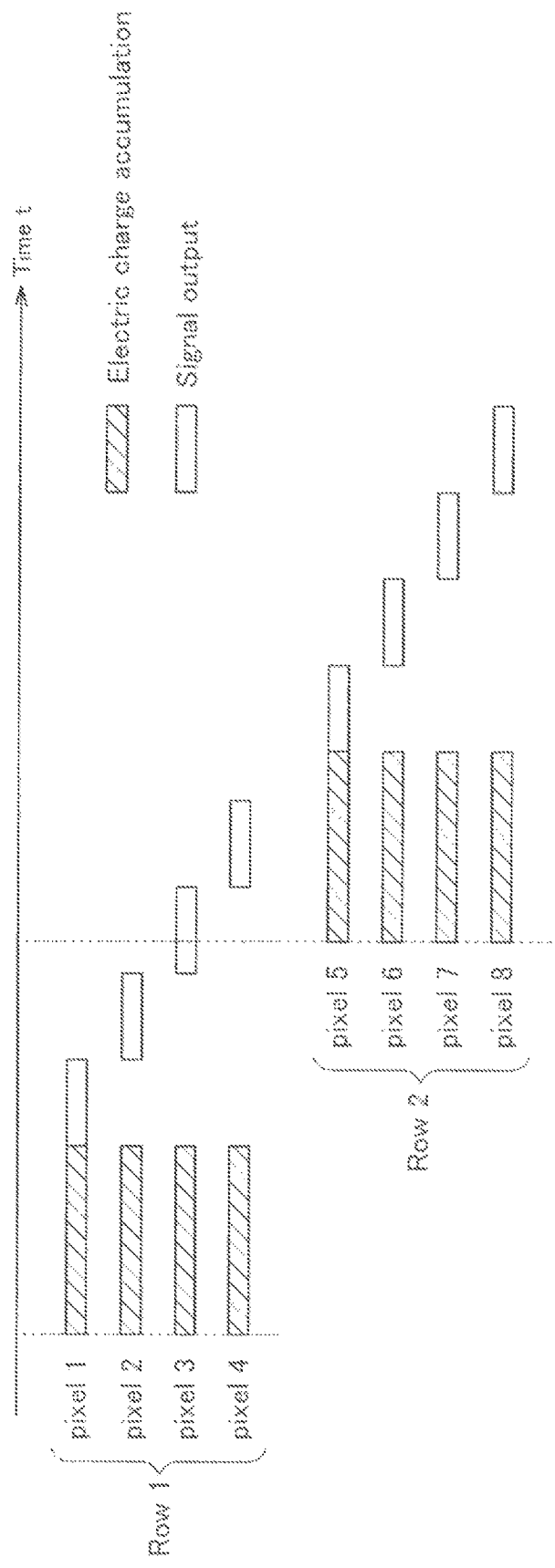
FIG. 5 is an explanatory diagram showing electric charge accumulation timings in the respective pixels, and signal output timings of the respective pixels.

With respect to the exposure timings, i.e., the electric charge accumulating operations in the respective pixels 21, as shown in FIG. 5, shutter signal lines 30 are installed with respect to the respective rows of the pixels 21 in order for the pixels 21 in the same row to perform electric charge accumulations at the same accumulation timing, and the pixels 21 in the respective rows perform electric charge accumulations at the same timing for each row on the basis of a signal from the shutter signal line 30. Row selecting switches 32 are connected to the shutter signal lines 30 installed along the respective rows. As shown in FIG. 5, the respective rows of the pixels 21 perform electric charge accumulations, i.e., exposure operations at timings shifted in sequence row by row, and with respect to signal outputs after the electric charge accumulations, signals based on the electric charges are output in sequence from the pixels 21 in the row in which electric charges have been accumulated, and pixel signals are output in sequence from all the pixels 21.

As shown in FIG. 2, the pixel amplifiers 22 are respectively provided on the output sides of the respective pixels 21, and the output sides of the pixel amplifiers 22 are connected to vertical signal lines 25 via the pixel selecting switches 23. The row scanning device 16 is connected such that electric charges in the respective pixels 21 arrayed in a matrix state are amplified by the pixel amplifiers 22, to be transmitted to the respective vertical signal lines 25 in the column direction, which are connected to the output sides thereof through the pixel selecting switches 23, and signals based on the electric charges in the respective pixels 21 in the respective rows are output in sequence through the respective vertical signal lines 25.

The column scanning device 17 is configured such that column selecting switches 24 connected to the output sides of the respective vertical signal lines 25 are connected to one horizontal signal line 26, and the vertical signal lines 25 in the column direction are selected by on-off control of the respective column selecting switches 24, and signals based on their loading are output from the pixels 21 in the respective vertical signal lines 25 through the one horizontal signal line 26. Therefore, the respective vertical signal lines 25 are disposed along the column direction, and the output sides of the pixels 21 in the respective row lines, which are disposed in the direction of the respective rows, are connected to the vertical signal lines 25 via the pixel amplifiers 22 and the pixel selecting switches 23. The vertical signal lines 25 are extended toward the column direction, and disposed parallel to the columns along the many pixels 21 disposed on the respective columns in a matrix state. Second amplifiers 27 are connected to the bottom ends of the respective vertical signal lines 25, and the output sides of the second amplifiers 27 are connected to the one horizontal signal line 26 via the column selecting switches 24.

On the other hand, in the row scanning device 16, as described above, the shutter signal lines 30 are installed along the respective rows of the pixels 21, and the respective pixels 21 in the same row are configured to perform electric charge accumulations simultaneously at an exposure timing based on a signal from this shutter signal line. The connection is made such that output signals from the pixels 21 are output on the basis of switching operations of the changing-over switches 28 and operations of the pixel selecting switches 23 after electric charge accumulations, and as shown in FIG. 5, pixel signals are output in sequence from all the pixels 21 in the respective rows and columns when photographing.

With this, when the shutter of the camera 10 is turned on, to photograph a visible light, in the pixel amplifier sequential output type imaging element 11, in the pixels 21 in the respective rows, the respective pixels 21 in the same row perform electric charge accumulations at the same timing. After the electric charge accumulations, signals based on the accumulated electric charges are output in sequence from all the pixels 21, to be amplified by the pixel amplifiers 22, and thereafter, the signals are transmitted to the vertical signal lines 25 on the basis of switching operations of the pixel selecting switches 23 and switching operations of the column selecting switches 24, to be output through the horizontal signal line 26.

That is, when a transmitted visible light is photographed by the camera 10, in the imaging element 11, in FIG. 2, the row selecting switch 32 of the shutter signal line 30 at the top stage is turned on, and electric charge accumulations are simultaneously performed in the pixels 21 at the top stage. Next, the row selecting switch 32 of the shutter signal line 30 in the second row is turned on, and electric charge accumulations are performed in the pixels 21 in the second row. Thereafter, electric charge accumulations are performed in sequence in the pixels 21 in the order of the third row, the fourth row, and the final row, that is, the electric charge accumulations are performed at exposure timings in which exposures (electric charge accumulations) for every respective row are shifted in sequence row by row. On the other hand, after performing the electric charge accumulations, as shown in FIG. 5, pixel signals based on the electric charges are output in sequence from the pixels 21 at the top stage of the pixels 21 in the respective rows.

At this time, in the imaging element 11 shown in FIG. 2, first, the pixel selecting switch 23 at the top stage, which is connected to the leftmost vertical signal line 25 is turned on, and the leftmost column selecting switch 24 connected to the horizontal signal line 26 is turned on, thereby outputting a signal from the leftmost pixel 21 at the top stage. Next, the pixel selecting switch 23 of the second pixel 21 from the left end in the same row is turned on, and the column selecting switch 24 connected to the second vertical signal line 25 is turned on, thereby outputting a signal from the second pixel 21 in the same row. In this way, first, the signals based on the accumulated electric charges are output in sequence from the pixels 21 in the top row, and next, the signals are output in sequence from the leftmost pixel 21 in the second row, and such operations are continued in the third row and the fourth row, and the signals are finally output in sequence from the pixels 21 in the bottom row.

As described above, in the imaging element 11 of FIG. 2, when photographing, exposure operations are performed such that the row selecting switch 32 thereof is turned on from the shutter signal line 30 at the top stage, and electric charge accumulations are simultaneously performed in the pixels 21 at the top stage, and next, the row selecting switch 32 of the shutter signal line 30 in the second row is turned on, and electric charge accumulations are performed in the pixels 21 in the second row. After the electric charge accumulations, as shown in FIG. 5, pixel signals based on the electric charges are output in sequence from the pixels 21 at the top stage of the pixels 21 in the respective rows. With this, finally, the signals are output from the pixels 21 in the bottom row through the rightmost vertical signal line 25, to take in a one-frame image signal.

As shown in FIG. 5, because the electric charge accumulating operations, i.e., the exposure timings in the respective rows of the pixels 21 are performed in sequence so as to be shifted in the imaging element 11, and the exposure timings in the pixels from the top row to the second row and the third row are shifted in sequence, for example, a time for taking in a one-frame image signal is a frame rate of the camera (for example, 1/30seconds to 1/60seconds). Because transmission data which is subjected to OOK-modulation (on-off keying modulation) Is superimposed on the visible light as a transmitted pulse signal, and there is a temporal contrast according to a transmitted pulse signal, the signals output from the pixels in the respective rows and columns in one frame contain the transmission data superimposed on the visible light, as a transmitted pulse signal, in a time of exposing the pixels in one frame.

With respect to a transmitted pulse signal which is subjected to OOK-modulation, to be superimposed on the visible light, a time denoting one sample is, for example, about 0.5 milliseconds, and a contrast change in luminance of the visible light containing this transmitted pulse signal is generated as light and dark bands in a photographed image by the imaging element 11. In accordance with this, when a visible light for visible light communication is photographed by the imaging element 11, light and dark bands containing an information signal is imaged in its one frame, and the image signal is transmitted to the image processing apparatus through the scanning device.

The camera 10 built into a general-purpose mobile telephone usually has a pixel amplifier sequential output type imaging element (CMOS image sensor) 11 built-in, and in the case where the number of pixels thereof is, for example, 12,000,000 pixels, the pixels are arrayed, for example, in 3000 rows×4000 columns, that composes one frame. Because a time for taking in signals from the respective pixels of one frame of the imaging element 11 is a frame rate of the camera 10, in the case of photographing at a frame rate of 1/30 seconds, for example, because a time of one frame is about 33 milliseconds, and a time of 1 bps of an information signal for visible light communication based on the above-described visible light communication standard is about 0.25 milliseconds, by processing each row as one sample, information signals of a plurality of samples are available in the visible light receiving apparatus using the camera 10 by photographing one frame.

In addition, in the visible light receiving apparatus of this embodiment, a color image signal which is imaged by the camera 10 to be output is subjected to gray-scale transformation, to be transformed into a black-and-white image signal, and its luminance component is extracted. However, with respect to color image signals which are photographed by the camera to be output, its luminance component may be extracted from each color signal.

Further, in this embodiment, an example in which a visible light containing ID information is transmitted from a visible light transmitter for visible light communication (not shown) will be described. However, in that case, unique ID information is respectively allocated to be set to a plurality of visible light transmitters, and those ID information may be sufficiently contained in one-frame image data.

Further, the camera 10 is used so as to photograph a single still image, and demodulate a transmission data signal that is transmitted through visible light communication on the basis of the image data containing light and dark bands, to regenerate or display the signal. However, the camera 10 is capable of photographing a moving image with a projector (illumination fixture) of a visible light transmission device that performs visible light communication serving as an object, to take in image data of a plurality of frames, and retrieving the transmission data signal from light and dark bands contained in those data.

Moreover, the above-described embodiment is configured, as shown in FIG. 2, such that the shutter signal lines 30 are installed along the row direction of the pixels 21 (in the horizontal cross direction in FIG. 2), and electric charge accumulations, i.e., exposure operations are performed simultaneously and at timings shifted in sequence row by row with respect to the pixels 21 in the respective rows. However, the embodiment may be configured such that the shutter signal lines are installed along the column direction of the pixels 21 (in the vertical direction in FIG. 2), and electric charge accumulations are performed simultaneously and at timings shifted in sequence column by column with respect to the pixels 21 in the respective columns.

In this case, light and dark bands which are imaged in one frame of a photographed image, and contain an information signal contained in a transmitted visible light are generated in the column direction of the pixels 21. That is, as described above, in the case where electric charge accumulations are performed simultaneously and at timings shifted in sequence row by row with respect to the pixels 21 in the respective rows, light and dark bands along the row direction (horizontal-light and dark bands) are generated in a photographed image. On the other hand, in the case where electric charge accumulations are performed simultaneously and at timings shifted in sequence column by column with respect to the pixels 21 in the respective columns, light and dark bands along the column direction (vertical-light and dark bands) are generated in a photographed image, and because transmitted transmission data are contained in the light and dark bands, it is possible to extract the transmitted data on the basis of the light and dark bands.

Figure 6:
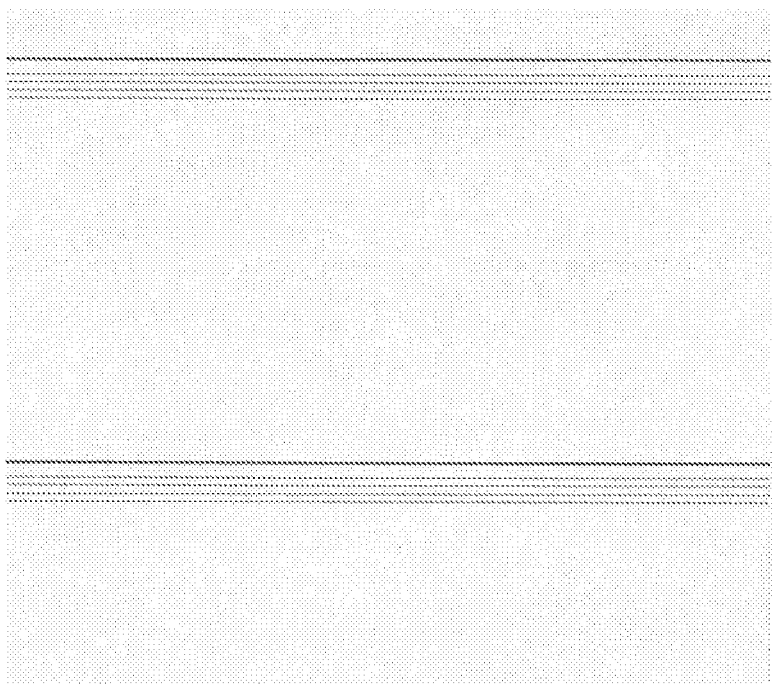
FIG. 6 is an explanatory diagram of an image that an image signal of the imaging element is subjected to gray-scale transformation, to be transformed into a black-and-white image signal, and its luminance component is extracted.

The image processing apparatus that processes a photographed image signal is, as shown in FIG. 1, equipped with an AD converter 18 and an image processing LSI 19, and is configured to convert an image signal into a digital signal through the AD converter 18, and take the digital signal into the image processing LSI 19, to perform image processing. When the image processing LSI 19 takes in the image digital signal containing color information and luminance information therein, the image processing LSI 19 retrieves only the luminance information, to transform the luminance information into gray-scale data of 0 to 255 gradations, for example, and extracts the luminance component of the signal, i.e., the light and dark band component and transmits the extracted data to a microprocessor 48 as shown in FIG. 1. Such light and dark bends in a one-frame photographed image are, as shown in FIG. 6, generated as crosswise light and dark bands in the photographed image, and an information signal for visible light communication is contained in a state of generation of the respective crosswise bands.

The portable terminal 1 has the camera 10 built-in as described above, and is composed of a PDA or a tablet type terminal connectable to a wireless LAN, or a mobile telephone connectable to a mobile telephone communication network or a wireless LAN, and is connected to a network such as the Internet through a wireless LAN or the like.

Further, the portable terminal 1 is, as shown in FIG. 1, composed chiefly of the microprocessor 48, and includes a storage unit 50 composed of a RAM, a ROM, or the like, and a peripheral interface 53 including an input/output circuit and the like. The portable terminal 1 is capable of touch input for various function switch input, and is equipped with a touch sensitive display 57 on which a moving image, a still image, a text, and the like are displayed, a display controller 56 that performs control of the touch sensitive display 57, and the like. Moreover, the portable terminal 1 is equipped with an RF circuit 54 for the connection to a wireless LAN or a mobile telephone communication network, and is connectable to a wireless LAN or a mobile telephone communication network through the peripheral interface 53 and the RF circuit 54.

Browser software, audio playback software, visible light receiving processing software, and the like are stored in advance in the storage unit 50 of the portable terminal 1. The microprocessor 48 of the portable terminal 1 takes in the transmission data signal (image data) for visible light communication which is photographed by the camera 10 having the above-described configuration, to calculate an average value of luminance components in the row direction, and further calculates a differential value on the basis of displacement of average values of the averaged luminance data of the respective rows. These average values of the luminance data show exposure amounts of light and dark bands generated in the respective rows of the respective pixels of the imaging element 11, and a differential value is calculated on the basis of displacement of the exposure amounts.

Further, the microprocessor 48 sets a predetermined threshold value with respect to a differential value of exposure amounts, digitalizes the differential value of the exposure amounts on the basis of this threshold value, extracts a transmitting signal received from the digitalized data, to demodulate the transmitting signal according to the OOK method, and acquires transmitted information such as audio data or image data transmitted from the visible light transmitters, to perform processing for regeneration or processing for display. Further, in the case where an information signal transmitted by a visible light is unique ID information of a visible light transmitter, the content information corresponding to the ID information is regenerated or displayed.

Therefore, an audio circuit 46 for regenerating audio signals and the above-described display 57 on which images and characters are displayed are provided in the portable terminal 1, and a speaker 52 is connected to the output side of the audio circuit 46, and a microphone 51 is connected to the input side thereof. As described above, the microprocessor 48 of the portable terminal 1 extracts ID information of a visible light transmitter from image data containing light and dark bands of a light source for visible light communication (illumination fixture) which is photographed by the camera 10, to perform receiving processing.

Moreover, the microprocessor 48 reads out audio data of content information stored in advance on the basis of received ID information, and converts the audio data into an analog signal, and thereafter, outputs the audio signal to the audio circuit 46. The audio circuit 46 amplifies the audio signal, and drives the speaker 52 to regenerate the audio. The apparatus is configured to display those on the touch sensitive display 57 through the display controller 56 in the case where the received receiving data or the content information is image data or character data.

The RF (Radio Frequency) circuit 54 of the portable terminal 1 includes an antenna system or a tuner, that is configured to transmit or receive an RF signal, to perform radio communication between an access point of a wireless LAN and a base station of a mobile telephone communication network connected to the Internet or the like.

Figure 4:
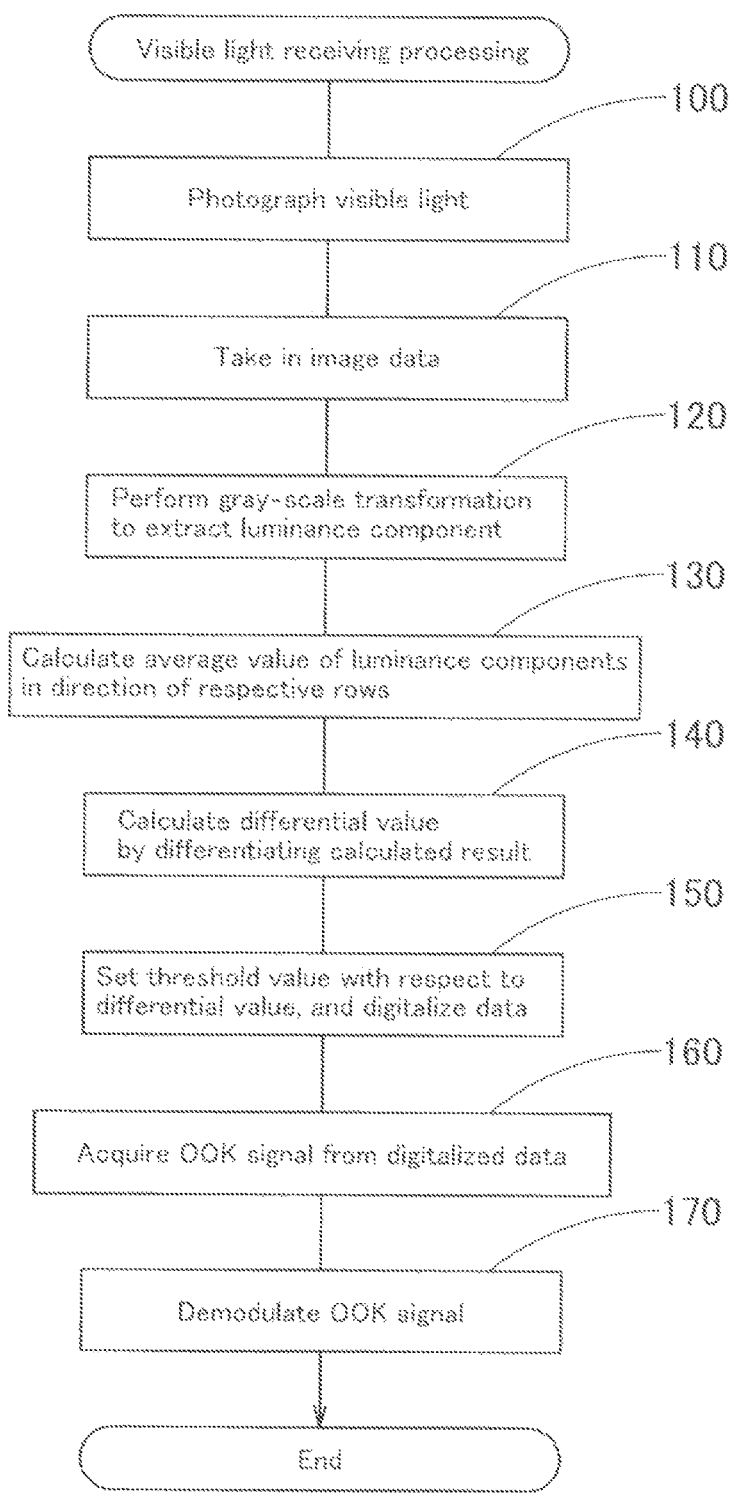
FIG. 4 is a flowchart of receiving processing of the visible light receiving apparatus.

Next, a usage mode of the visible light receiving apparatus having the above-described configuration will be described, and the visible light receiving method will be described with reference to a flowchart of FIG. 4.

The mobile terminal 1 is used for viewing and listening to explanatory content (audio guide) of exhibits in, for example, an art museum, a museum, or the like. In this case, visible light transmitters (for example, a visible light transmission device having a projector serving as an illumination fixture as well) (not shown) are installed in places, where the explanatory content (audio guide) is provided, in the vicinity of exhibits in its facility or the like. Different ID information is allocated to be set in the respective visible light transmitters, and the content information corresponding to the respective ID information is stored in the storage unit 50 of the portable terminal 1.

In the case where the portable terminals 1 are lent to users to be used as explanatory devices for exhibits as in an art museum and a museum, the explanatory content information is taken into those portable terminals 1 in advance so as to correspond to the respective ID information (IDs corresponding to the respective exhibits), to be stored in the storage units 50. However, these content information are stored in advance along with the ID information in a content server on a network, for example, and at the time of holding an exhibition, by operating the portable terminal 1, it is possible to access to the content server via the network, to download the content information into the portable terminal 1, and use the content information. Thereby, in the case where a new exhibition is held in an art museum, a museum, or the like, if the explanatory content thereof is downloaded in advance to be stored in the storage unit 50 of the portable terminal 1 at the start thereof, it is possible to use the portable terminal 1 as it is without connecting to the network during holding of the exhibition.

The projectors of the respective visible light transmitters serve as illumination fixtures as well in facilities such as art museums, and the light from the projecting unit illuminates an exhibit, and the ID information denoting the explanatory content for the exhibit is subjected to OOK modulation (on-off keying modulation), and the light is superimposed on a visible light, to be irradiated. With respect to the OOK modulation by the visible light transmitter, transmission data are encoded, a transmitted pulse signal is created on the basis of the encoded transmitted coded data, and the transmitted pulse signal is superimposed on a visible light to be transmitted. A transmitted pulse signal is created so as to have a ratio of "0' and '1" always constant, and a visible light transmission is performed so as to have illuminance of visible light always constant regardless of transmission data, which does not cause a feeling of strangeness at the time of illuminating an exhibit.

A user operates the camera 10 of the portable terminal 1 to turn on the shutter, to photograph the visible light illuminating the exhibit (Step 100). At this time, the imaging element 11 of the camera 10 receives the visible light which is subjected to visible light transmission, and as shown in FIG. 5, the pixels 21 in the respective rows perform electric charge accumulations at the same timing for each row of the pixels 21 on the basis of signals from the shutter signal lines 30. The pixels 21 in the respective rows perform electric charge accumulations at timings shifted in sequence row by row, and thereafter, pixel signals based on the electric charges are output in sequence from the pixels 21 in a row in which electric charges have been accumulated, to be amplified by the pixel amplifiers 22, and the pixel signals are output in sequence from all the pixels 21.

At this time, the imaging element 11 performs taking in of signals from the pixels 21, first, from the leftmost pixel 21 in the top row through the vertical signal lines 25 and the horizontal signal line 26 on the basis of switching operations of the pixel selecting switches 23 and switching operations of the column selecting switches 24. Next, the imaging element 11 performs taking in of signals from the leftmost pixel 21 to the rightmost pixel 21 in the second row, and in the same way, performs readout of signals in sequence from the pixels 21 in the third row and the fourth row, and finally, a signal is output from the rightmost pixel 21 in the bottom row. Thereby, retrieving image signals of one frame from all the pixels 21 in the imaging element 11, to be transmitted to the image processing apparatus through the AD converter 18.

That is, the imaging element 11 operates so as to output signals based on the accumulated electric charges in sequence through the pixel amplifiers 22 in an exposure timing for each row, to take in the signals with respect to the respective pixels 21. At this time, first, the pixel selecting switch 23 at the top stage, which is connected to the leftmost vertical signal line 25 in FIG. 2 is turned on, and the leftmost column selecting switch 24 connected to the horizontal signal line 26 is turned on, to output a signal of the pixel 21 located at the left end at the top stage in FIG. 2. Next, the pixel selecting switch 23 in the top stage, which is connected to the second vertical signal line 25 from the left end in the same row is turned on, and the second column selecting switch 24 from the left end connected to the horizontal signal line 26 is turned on, to output a pixel signal of the pixel 21 located in the second stage from the left of the top row in FIG. 2.

In this way, the imaging element 11 performs on-off control of the pixel selecting switches 23 and the column selecting switches 24, thereby outputting signals in sequence from all the pixels 21 from the left end to the right end, first, with respect to all the pixels 21 in the top row, and thereafter, outputting signals based on the accumulated electric charges through the vertical signal lines 25 and the horizontal signal line 26 with respect to the pixels 21 in the second row from the top, and these signals are output as pixel signals in sequence from the pixels from left end to the right end. Thereafter, in the same way, signals of the respective pixels 21 are output through the vertical signal lines 25 and the horizontal signal line 26 to be taken in with respect to the pixels 21 in the third row and the fourth row, and further, the imaging element 11 finally outputs a signal from the pixel 21 in the bottom row through the rightmost vertical signal line 25.

With this, the pixel signals which are exposed and based on the accumulated electric charges are amplified by the pixel amplifiers 22 in the pixels 21 in each row in the imaging element 11, to be output in sequence and in the arrangement sequence of the respective rows from all the pixels 21, as shown in FIG. 5, through the vertical signal lines 25 and the horizontal signal line 26.

In all the pixels 21 in the imaging element 11, as described above, exposures are performed for each row, and in the case where transmitted pulse signals based on transmission data are superimposed on the transmitted visible light, and a temporal contrast is generated in the visible light, light and dark bands based on the contrast (a horizontal-light and dark bands as shown in FIG. 6) are generated along the row direction in the pixel signal containing the transmission data. That is, in the case where pulse signals of visible light transmitting signals are contained in the photographed visible light, light and dark bends appear along the row direction according to a change in exposure amounts of the respective pixels 21 in an image photographed by the imaging element 11.

The pixel signals containing such light and dark bands output from the respective pixels 21 in the imaging element 11 are converted into digital signals by the AD converter 18, to be transmitted to the image processing LSI 19. The image processing LSI 19 takes in image signals of one frame, to perform image processing for retrieving the luminance information contained therein (Step 110).

In the case where a frequency of a transmitted pulse signal is 5 KHz for example, a transmitted pulse signal of 5 Kbps is superimposed on a visible light to be irradiated from the projector of the visible light transmitter. In this case, a time denoting one sample of a transmitted pulse signal is about 0.5 milliseconds, and a contrast change in luminance of the visible light containing this transmitted pulse signal is generated as light and dark bands in a photographed image by the imaging element 11. The light and dark bands are, as shown in FIG. 6, generated in the row direction of the imaging element 11.

When the image processing LSI 19 takes in the digital image signal containing color information and luminance information therein, the image processing LSI 19 retrieves only the luminance information, to transform the luminance information into gray-scale data of 0 to 255 gradations, for example, and extracts the luminance component of the signal, i.e., the light and dark band component, and transmits the extracted data to the microprocessor 48 (Step 120). In addition, in the case where the imaging element 11 is not for color photographing, but for black-and-white photographing, gray-scale transformation is not needed.

Figure 7:
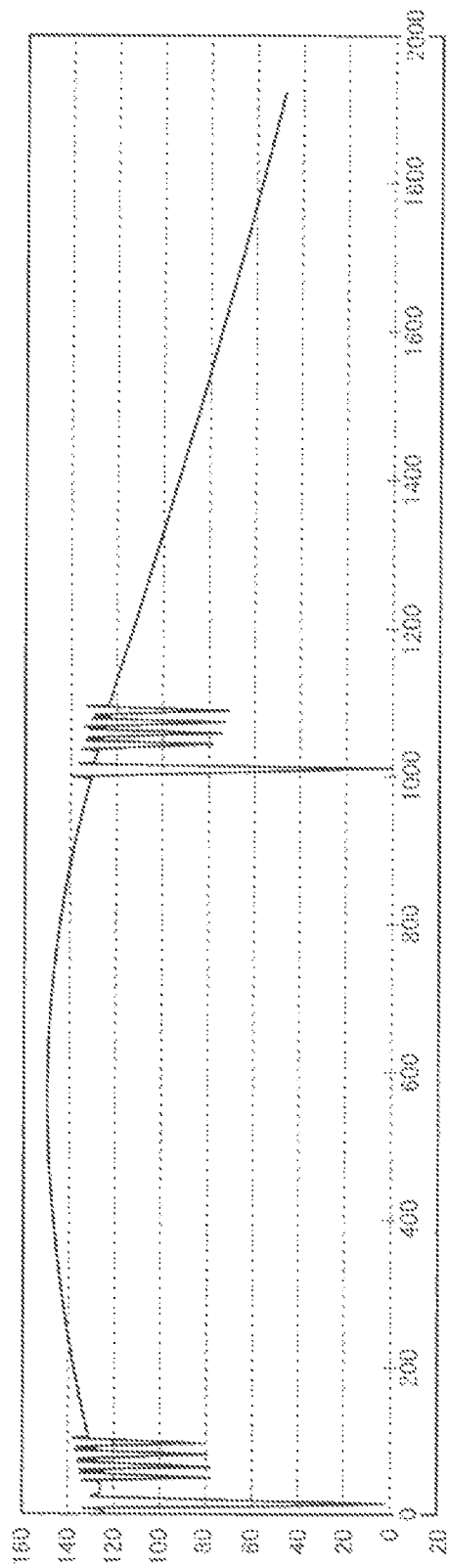
FIG. 7 is a luminance average value graph that average values of luminance components output from the pixels on the respective row lines along the row direction of the imaging element are calculated, and the luminance data of the respective row lines are graphed.

When the microprocessor 48 takes in the extracted data of the light and dark band component contained in the photographed visible light, the microprocessor 48 calculates an average value of the luminance components in the direction of the respective rows (Step 130). As shown in a luminance average value graph of FIG. 7, an average value of the luminance components in the direction of the respective rows greatly changes according to the horizontal axis (time axis) in the direction of the respective rows in the portion where the light and dark bands are generated.

Moreover, the microprocessor 48 calculates a differential value on the basis of a difference of the averaged luminance data of the respective rows, that is, the average values of the exposure amount signals of the respective rows (Step 140).

Figure 8:
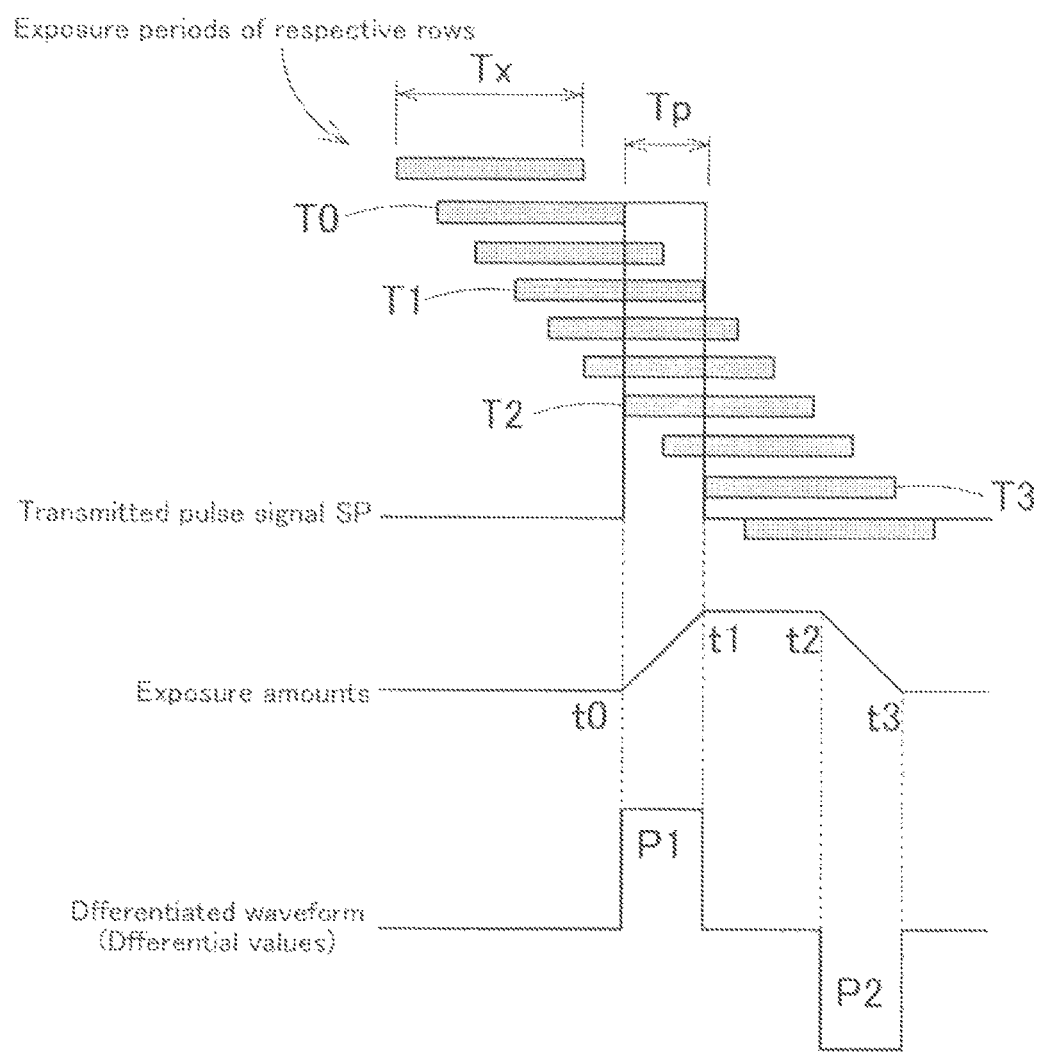
FIG. 8 is a timing chart of exposure periods of pixels of respective rows, a transmitting signal, and respective graphs of exposure amounts and differential values.

In FIG. 8, the exposure periods Tx of the pixels 12 of the respective rows in the imaging element 11 and a transmitted pulse signal are described in the upper stage, a graph of exposure amount signals is described in the middle stage, and a waveform of differential values is described in the lower stage.

For example, as shown in FIG. 8, in the case where a visible light containing a transmitted pulse signal (visible light transmitting signal) SP with a pulse width Tp is subjected to visible light transmission, and the visible light is photographed by the imaging element 11, the more the transmitted pulse signal SP is contained in the exposure periods Tx of the pixels 12 of the respective rows, the larger the exposure amounts of the pixels 12 of the respective rows are, that makes a photographed image brighter.

Here, in view of the relationship of the transmitted pulse signal SP, the exposure periods Tx of the respective rows and the exposure amounts, focusing attention on the exposure periods T0, T1, T2 and T3 in FIG. 8, because the transmitted pulse signal SP touches the edge of the exposure period T0 at the time of rising of the transmitted pulse signal SP, and the exposure time in the transmitted pulse signal SP gradually increases up to the following exposure period T1, the exposure amount graph (exposure amount signal) from a clock time t0 to a clock time t1 gradually rises, and because the exposure time in the transmitted pulse signal SP does not change from the exposure period T1 to the exposure period T2, the exposure amount graph from the clock time t1 to a dock time t2 is constant. Moreover, because the exposure time in the transmitted pulse signal SP gradually decreases from the exposure period T2 to the exposure period T3, the exposure amount graph from the clock time t2 to a clock time t3 gradually lowers.

In this way, as a result of the changes in the exposure amounts according to the transmitted pulse signal SP, light and dark bands appear in a photographed image, and it is possible to extract the transmitted pulse signal SP on the basis of the exposure amounts of the pixels 12 of the respective rows of the imaging element 11.

Therefore, in visible light receiving processing, as in Step 140, an average value of luminance data, that is, exposure amounts of the respective rows are differentiated by a time, to calculate a differential value. A differential value of the exposure amounts becomes a difference in the exposure amounts in the exposure periods before and after, and a graph of the differential values becomes, as shown in the lower stage of FIG. 8, a waveform in which a positive pulse P1 is generated in a period of the pulse width Tp of the transmitted pulse signal, and thereafter, a negative pulse P2 is generated in a period in which the exposure amount lowers.

In this way, because a waveform of differential values of the exposure amounts shows a pulse waveform corresponding to pulses of the transmitted pulse signal, a threshold value is set with respect to the differential values at a predetermined level, and the differential value data are digitalized, thereby extracting the information on the transmitted pulse signal corresponding to the positive pulse P1 (Step 150).

Figure 9:
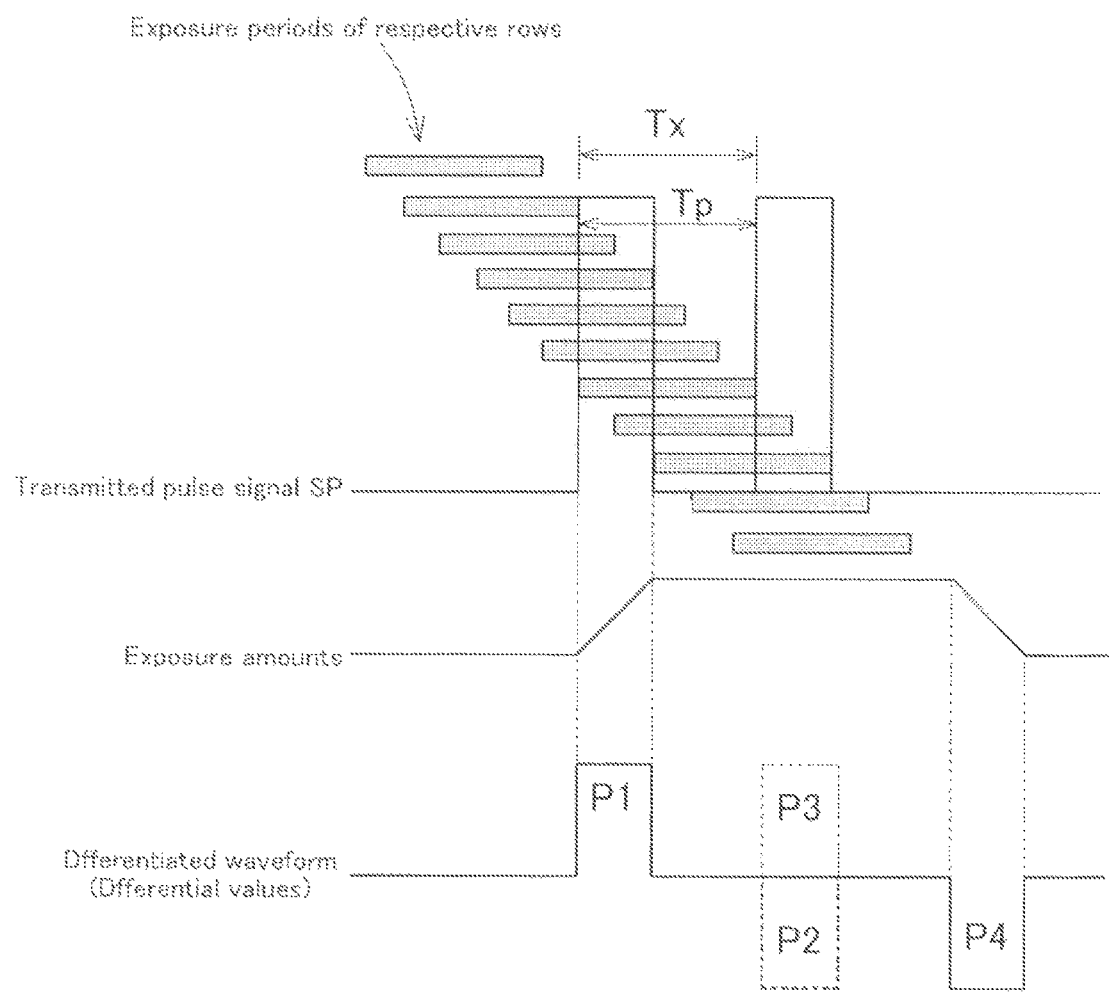
FIG. 9 is a timing chart of exposure periods of pixels of respective rows, a transmitting signal, and respective graphs of exposure amounts and differential values.

In addition, as shown in FIG. 9, in the case where the exposure time Tx and the pulse interval (pulse cycle) Tp of a transmitted pulse signal are the same, in a waveform of the differential values of the exposure amounts, the negative pulse P2 corresponding to the positive pulse P1 which is generated at a timing of the previous transmitting pulse, and a positive pulse P3 which is generated at a timing of the following transmitting pulse are simultaneously generated. In case of causing such a phenomenon, the pulse P3 in a differentiated waveform is denied, that makes it impossible to precisely detect a transmitted pulse signal. In order to resolve such a defect, it is recommended that a pulse width of a visible light transmitting signal be set to be shorter than an exposure time in imaging, and the pulse interval Tp of a visible light transmitting signal and the exposure time Tx be set to be different from one another.

Figure 10:
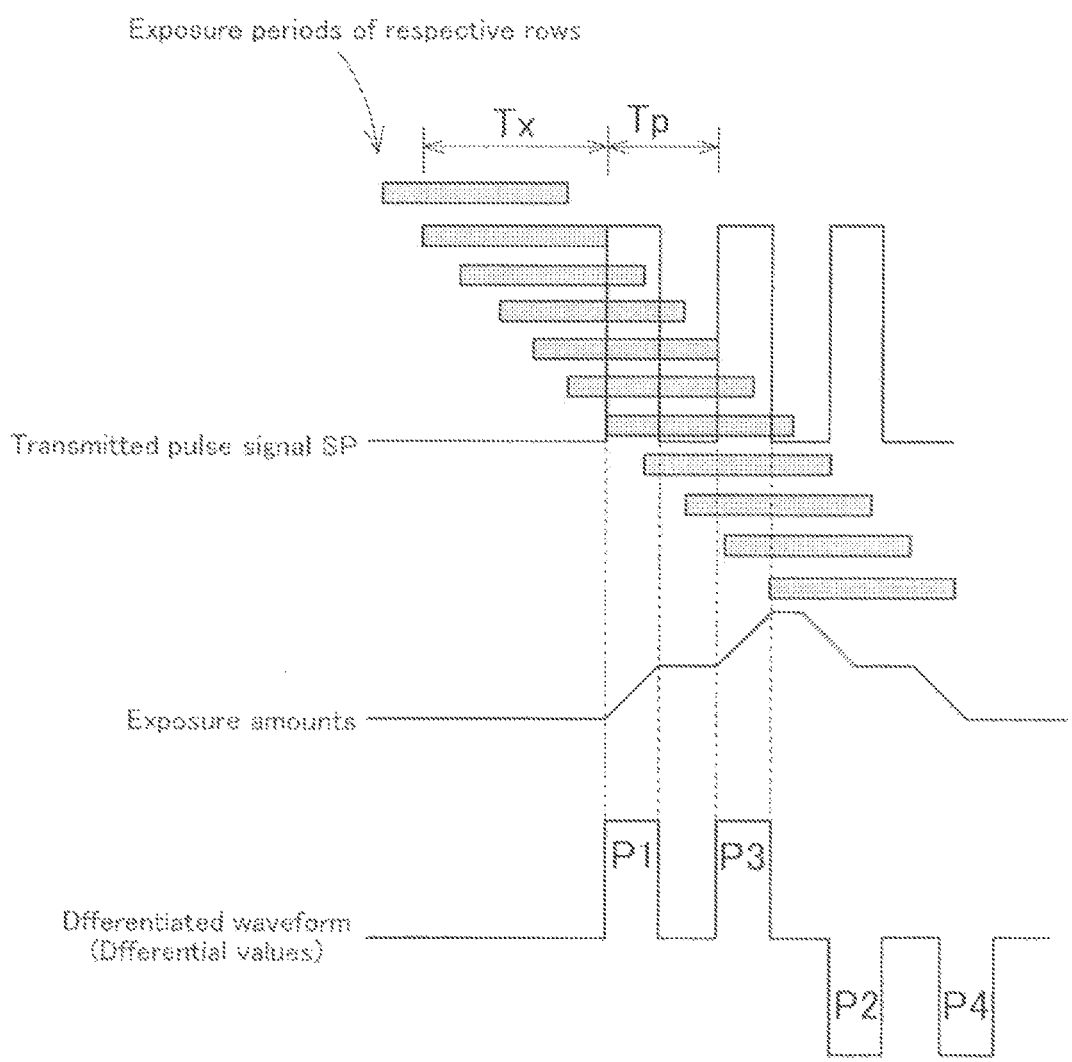
FIG. 10 is a timing chart of exposure periods of pixels of respective rows, a transmitting signal, and respective graphs of exposure amounts and differential values.

Further, as shown in FIG. 10, even in the case where the pulse interval (pulse cycle) Tp of the transmitted pulse signal is shorter than the exposure time Tx, when setting that positive and negative pulses are not generated simultaneously in a differentiated waveform of the differential values of the exposure amounts, the positive pulses P1 and P3 in FIG. 10 are not denied in any case, thereby it is possible to precisely extract the received transmitted pulse signal. Accordingly, provided that a method in which a differential value of exposure amounts is calculated, to extract a transmitted pulse signal is adopted, it is possible to speed up a transmission speed of a visible light transmitting signal regardless of an exposure time of the camera.

Next, the microprocessor 48 extracts the transmitted OOK signal (on-off keying modulated signal) from the digitalized data digitalized as described above (Step 160). Because this OOK signal is made such that the original transmitted data is encoded so as to suppress flicker of the visible light serving as an illuminating ray at the time of visible light transmission, the original transmitted data is extracted according to the encoding to perform demodulation of the OOK signal (Step 170).

Then, in the case where the visible light transmitted data are audio data or image character data, the microprocessor 48 carries out processing for regeneration or processing for display of those. In the case where the information signal transmitted by a visible light is unique ID information of the visible light transmitter, the content information (audio guide or the like) corresponding to the ID information is read out of the storage unit 50, to be regenerated through the speaker 52 or displayed on the display 57.

In this way, a visible light subjected to visible light transmission is photographed by the imaging element 11, image data of light and dark bands acquired from the imaging signals are taken in by frame, and a differential value is calculated on the basis of displacement of exposure amounts of the respective rows of the pixels output in sequence, to demodulate the visible light transmitting signal on the basis of the differential value, that is, a difference in image data before and after the light and dark bands generated in each pixel is to be calculated. Therefore, it is possible to precisely demodulate the pulse information on the visible light transmitting signal on the basis of the image data of the light and dark bands.

Moreover, because a differential value is calculated on the basis of displacement of the exposure amounts of the respective rows, a transmission speed (a width of the light and dark bands) of a transmitting signal is not, as in the conventional method, limited by an upper limit of a shutter speed in any case, thereby it is possible to receive a visible light transmitting signal transmitted at a speed much higher than that in the conventional method by merely performing photographing by a general-purpose camera, and demodulate the received visible light transmitting signal at high speed.

Further, in the portable terminal 1 in which the general-purpose camera 10 is mounted, an image is photographed by the pixel amplifier sequential output type imaging element 11, light and dark bands corresponding to the information signal are generated in the row direction or the column direction in the photographed image, and an information signal is captured in the photographed image. At this time, the light and dark bands contained in the photographed image contains an information signal changing according to a time axis (a contrast change in luminance of the visible light to be transmitted), and the information signal transmitted through visible light communication is contained in a state of generation of the light and dark bands. By extracting the information signal from the light and dark bands, for the portable terminal 1 such as a mobile telephone in which the general-purpose camera 10 is mounted, there is no need to provide a dedicated light receiving element for receiving a visible light for visible light communication, and it is possible to easily receive an information signal for visible light communication by use of the general-purpose portable terminal 1. Moreover, because it is possible to extract image data of the respective rows in one frame as a plurality of samples of information signals in one processing, it is possible to receive transmission data at high speed as compared to the conventional method.

REFERENCE SIGNS LIST

1 Portable terminal
10 Camera
11 Imaging element
12 Optical diffusion filter
13 Lens
14 Iris
16 Row scanning device
17 Column scanning device
18 AD converter
21 Pixel
22 Pixel amplifier
23 Pixel selecting switch
24 Column selecting switch
25 Vertical signal line
26 Horizontal signal line
27 Second amplifier
28 Changing-over switch
30 Shutter signal line
31 Pixel selecting switch
32 Row selecting switch
46 Audio circuit
48 Microprocessor
50 Storage unit
51 Microphone
52 Speaker
53 Peripheral interface
54 RF circuit
56 Display controller
57 Display

The invention claimed is:

1. A visible light receiving method comprising;
a step of photographing a visible light of a visible light transmitting signal that an information signal is superimposed on the visible light, and which is irradiated for visible light communication by a pixel amplifier sequential output type imaging element with a camera having the imaging element, and accumulating electric charges generated in respective pixels of the imaging element;
a step of amplifying the electric charges generated in the respective pixels by respective pixel amplifiers with the imaging element, and outputting imaging signals based on the electric charges accumulated in the respective pixels in sequence at timings for respective rows of the pixels from the pixel amplifiers of the respective pixels;
a step of taking in the imaging signals output in sequence for the respective rows of the pixels from the pixel amplifiers of the respective pixels by frame, and calculating exposure amounts for the respective rows of the pixels denoting light and dark bands; and
a step of calculating a differential value of the exposure amounts on the basis of a difference in the exposure amounts denoting the light and dark bands of the respective rows of the pixels,
the exposure amounts of the respective rows of the pixels are processed as one sample, and the information signal is demodulated on the basis of the differential value calculated from the exposure amounts of a plurality of samples in one frame.

2. The visible light receiving method according to claim 1, wherein the visible light transmitting signal is subjected to on/off modulation on the basis of an information signal to be transmitted, to be superimposed on the visible light, the differential value is calculated by differentiating exposure amounts of the respective rows of the pixels denoting the light and dark bands, a predetermined threshold value is set with respect to the differential value, and the differential value data is digitalized on the basis of the threshold value, to demodulate the visible light transmitting signal.

3. The visible light receiving method according to claim 1, wherein a pulse width of the visible light transmitting signal is shorter than an exposure period of the respective rows of the pixels, and a pulse interval of the visible light transmitting signal is set to be different from the exposure period.

4. The visible light receiving method according to claim 3, wherein the exposure period is set to be longer than a pulse interval of the visible light transmitting signal.

* * * * *